United States Patent
Kailey et al.

(10) Patent No.: US 10,855,881 B1
(45) Date of Patent: Dec. 1, 2020

(54) VECTORIZED MULTI-LEVEL HALFTONING USING TERNARY LOGIC

(71) Applicants: Walter F. Kailey, Frederick, CO (US); Thomas Rutkowski, Denver, CO (US); David Ward, Broomfield, CO (US)

(72) Inventors: Walter F. Kailey, Frederick, CO (US); Thomas Rutkowski, Denver, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/719,299

(22) Filed: Dec. 18, 2019

(51) Int. Cl.
| | |
|---|---|
| H04N 1/405 | (2006.01) |
| G06K 15/02 | (2006.01) |
| H04N 1/40 | (2006.01) |

(52) U.S. Cl.
CPC ..... *H04N 1/40087* (2013.01); *G06K 15/1881* (2013.01); *H04N 1/4057* (2013.01)

(58) Field of Classification Search
CPC ....... H04N 1/40087; H04N 1/405–407; H04N 1/4072; H04N 1/52; H04N 1/6027; H04N 1/4057; G06K 15/1881
See application file for complete search history.

(56) References Cited

U.S. PATENT DOCUMENTS

| | | | |
|---|---|---|---|
| 5,121,446 A * | 6/1992 | Yamada | H04N 1/4052 382/252 |
| 5,710,827 A | 1/1998 | Perumal et al. | |
| 6,021,217 A | 2/2000 | Nakahara | |
| 7,116,447 B2 | 10/2006 | Braun et al. | |
| 7,422,300 B2 | 9/2008 | Yamanobe | |
| 7,480,072 B2 | 1/2009 | Roylance | |
| 9,641,726 B1 | 5/2017 | Schweid et al. | |
| 10,277,775 B2 | 4/2019 | Kirchhoff et al. | |
| 2004/0125410 A1* | 7/2004 | Shirata | H04N 1/4072 358/2.1 |
| 2010/0171970 A1* | 7/2010 | Takayama | H04N 1/60 358/1.9 |
| 2016/0173724 A1* | 6/2016 | Kakutani | H04N 1/4051 358/3.13 |
| 2019/0220714 A1* | 7/2019 | Kakutani | H04N 1/409 |

FOREIGN PATENT DOCUMENTS

| | | |
|---|---|---|
| CN | 1628980 A | 6/2005 |
| JP | 09046518 A * | 2/1997 |

OTHER PUBLICATIONS

Robert Ulichney; The void-and-cluster method for dither array generation; Digital Equipment Corporation; Maynard, MA; http://proceedings.spiedigitallibrary.org.

* cited by examiner

*Primary Examiner* — Scott A Rogers
(74) *Attorney, Agent, or Firm* — Duft & Bornsen, PC

(57) ABSTRACT

Systems, methods, software for halftoning. In one embodiment, a halftone system receives a raster image comprising an array of pixels, and performs a multi-level halftoning process on one or more blocks of the pixels. The system identifies thresholds that distinguish different intensity levels. For each block, the system identifies a set of pixel values for the pixels in the block, performs a vectorized comparison of the set of pixel values to each of the thresholds to generate sets of comparison bits, and performs ternary logic operations with three of the sets of comparison bits as input to define a set of low-order bits and a set of higher-order bits for the pixels in the block.

20 Claims, 14 Drawing Sheets

*FIG. 7*

| | 0 | 1 | 2 | 3 | 4 | 5 | 6 | 7 | ... | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| ... | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

FIG. 8

| | 0 | 1 | 2 | 3 | 4 | 5 | 6 | 7 | | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| ... | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

FIG. 18

VECTORIZED MULTI-LEVEL HALFTONING USING TERNARY LOGIC

TECHNICAL FIELD

This disclosure relates to the field of image formation, and more particularly, to halftoning of raster images.

BACKGROUND

Halftoning is a technique for simulating a continuous tone image on a two-dimensional medium with a pattern of dots varying in size and/or spacing. A reproduction of a halftoned image appears to consist of many colors or grays when viewed from a proper distance. For example, a halftoned image comprised of black and white dots may appear to display various gray levels. Earlier-generation printers had a coarse resolution, and were limited to image reproduction in two color levels (i.e., pixels were either marked with a color or left blank). A halftoning technique for these types of printers is commonly referred to as bi-level halftoning, which produces a halftoned image with pixel values defined by one bit. Printers have evolved to accommodate finer resolutions with multiple intensity levels. For such printers, a multi-level or multi-bit halftoning technique may be used to produce a halftoned image with pixel values defined by multiple bits (e.g., two-bits, three-bits, etc.). Multi-level halftoning produces better perceived fidelity to the original image at lower spatial resolution as compared to bi-level halftoning. However, multi-level halftoning may be computationally expensive.

SUMMARY

Provided herein are a halftone system, method, and software for multi-level halftoning using ternary logic. As an overview, a halftone system as described herein operates on a block of pixels from a raster image. The halftone system compares pixel values for the block of pixels to thresholds that are defined to distinguish multiple intensity levels. For example, in four-level reproduction, the halftone system compares pixel values for the block of pixels to three thresholds. A comparison of the pixel values to each of the thresholds results in a set of comparison bits. The halftone system uses ternary logic operations to map the comparison bits for each pixel to an output bit. For example, one ternary logic operation may be used to map the comparison bits to a lower-order bit for a pixel, and another ternary logic operation may be used to map the comparison bits to a higher-order bit for the pixel. The ternary logic operations may therefore be used to generate bit planes that, in combination, define a halftoned image of the raster image. For example, a two-bit (four level) output is comprised of two bit planes: one for the low-order bit (or least significant bit), and one for the higher-order bit (or most significant bit) of each pixel. One technical benefit is that multi-level halftoning as described herein is more computationally efficient, as there is an order of magnitude less instructions per pixel or per block of pixels than conventional approaches.

One embodiment comprises a halftone system comprising at least one processor, and a memory including computer program code executable by the processor. The processor causes the halftone system to receive a raster image comprising an array of pixels, and perform a multi-level halftoning process on one or more blocks of the pixels. For the multi-level halftoning process, the processor further causes the halftone system to identify thresholds that distinguish different intensity levels. For each block of the pixels from the one or more blocks, the processor causes the halftone system to identify a set of pixel values for the pixels in the block, perform a vectorized comparison of the set of pixel values to each of the thresholds to generate sets of comparison bits, perform a first ternary logic operation with three of the sets of comparison bits as input to define a set of low-order bits for the pixels in the block, and perform a second ternary logic operation with three of the sets of comparison bits as input to define a set of higher-order bits for the pixels in the block.

Another embodiment comprises a method of halftoning. The method comprises receiving a raster image comprising an array of pixels, and performing a multi-level halftoning process on one or more blocks of the pixels. The multi-level halftoning process includes identifying thresholds that distinguish different intensity levels. For each block of the pixels from the one or more blocks, the multi-level halftoning process includes identifying a set of pixel values for the pixels in the block, performing a vectorized comparison of the set of pixel values to each of the thresholds to generate sets of comparison bits, performing a first ternary logic operation with three of the sets of comparison bits as input to define a set of low-order bits for the pixels in the block, and performing a second ternary logic operation with three of the sets of comparison bits as input to define a set of higher-order bits for the pixels in the block.

Another embodiment comprises a non-transitory computer readable medium embodying programmed instructions which, when executed by a processor, are operable for performing a method of halftoning. The method comprises receiving a raster image comprising an array of pixels, and performing a multi-level halftoning process on one or more blocks of the pixels. The multi-level halftoning process includes identifying thresholds that distinguish different intensity levels. For each block of the pixels from the one or more blocks, the multi-level halftoning process includes identifying a set of pixel values for the pixels in the block, performing a vectorized comparison of the set of pixel values to each of the thresholds to generate sets of comparison bits, performing a first ternary logic operation with three of the sets of comparison bits as input to define a set of low-order bits for the pixels in the block, and performing a second ternary logic operation with three of the sets of comparison bits as input to define a set of higher-order bits for the pixels in the block.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 illustrates a raster image that includes an array of pixels arranged in rows and columns.

FIG. 8 illustrates a block of pixels in a raster image in an illustrative embodiment.

FIG. 18 illustrates a halftoned image with bit planes merged in an illustrative embodiment.

DETAILED DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
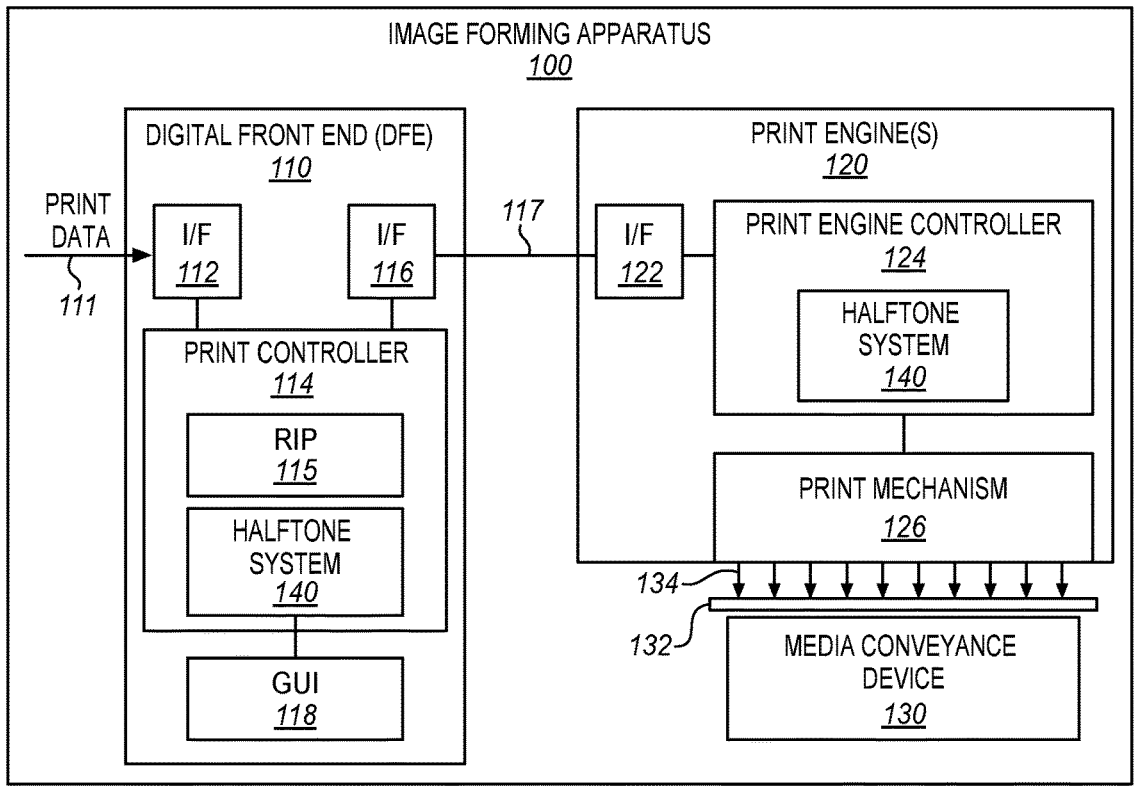
FIG. 1 is a schematic diagram of an image forming apparatus in an illustrative embodiment.

FIG. 1 is a schematic diagram of an image forming apparatus 100 in an illustrative embodiment. Image forming apparatus 100 is a type of device that executes an image forming process (e.g., printing) on a recording medium 132. Image forming apparatus 100 may comprise a continuous-form printer that prints on a web of continuous-form media, such as paper. Although a continuous-form printer is discussed, concepts described herein may also apply to alternative print systems, such as cut-sheet printers, wide format printers, 3D printers, etc.

In this embodiment, image forming apparatus 100 includes a Digital Front End (DFE) 110, one or more print engines 120, and a media conveyance device 130. DFE 110 comprises a device, circuitry, and/or other component configured to accept print data 111, and convert the print data 111 into a suitable format for print engine 120. DFE 110 includes an Input/Output (I/O) interface 112, a print controller 114, a print engine interface 116, and a Graphical User Interface (GUI) 118. I/O interface 112 comprises a device, circuitry, and/or other component configured to receive print data 111 from a source. For example, I/O interface 112 may receive the print data 111 from a host system (not shown), such as a personal computer, a server, etc., over a network connection, may receive print data 111 from an external memory, etc. Thus, I/O interface 112 may be considered a network interface in some embodiments.

The print data 111 comprises a file, document, print job, etc., that is formatted with a Page Description Language (PDL), such as PostScript, Printer Command Language (PCL), Intelligent Printer Data Stream (IPDS), etc. Print controller 114 comprises a device, circuitry, and/or other component configured to transform the print data 111 into one or more digital images that may be used by print engine 120 to mark a recording medium 132 with ink, toner, or another recording material. Thus, print controller 114 includes a Raster Image Processor (RIP) 115 that rasterizes the print data 111 to generate digital images. A digital image comprises a two-dimensional array of pixels. Whereas the print data 111 in PDL format is a high-level description of the content (e.g., text, graphics, pictures, etc.), a digital image defines a pixel value or color value for each pixel in a display space. Print engine interface 116 comprises a device, circuitry, and/or other component configured to communicate with print engine 120, such as to transmit digital images to print engine 120. Print engine interface 116 is communicatively coupled to print engine 120 via a communication link 117 (e.g., a fiber link, a bus, etc.), and is configured to use a data transfer protocol to transfer the digital images to print engine 120. GUI 118 is a hardware component configured to interact with a human operator. GUI 118 may include a display, screen, touch screen, or the like (e.g., a Liquid Crystal Display (LCD), a Light Emitting Diode (LED) display, etc.). GUI 118 may include a keyboard or keypad, a tracking device (e.g., a trackball or trackpad), a speaker, a microphone, etc. A human operator may access GUI 118 to view status indicators, view or manipulate settings, schedule print jobs, etc.

Print engine 120 includes a DFE interface 122, a print engine controller 124, and a print mechanism 126. DFE interface 122 comprises a device, circuitry, and/or other component configured to interact with DFE 110, such as to receive digital images from DFE 110. Print engine controller 124 comprises a device, circuitry, and/or other component configured to process the digital images received from DFE 110, and provide control signals to print mechanism 126. Print mechanism 126 is a device or devices that mark the recording medium 132 with a recording material 134, such as ink, toner, etc. Print mechanism 126 is configured for variable droplet or dot size to reproduce multiple intensity levels, as opposed to a bi-level mechanism where a pixel is either "on" or "off". For example, if print mechanism 126 is an ink-jet device, then multiple intensity levels per pixel may be achieved by printing one, two, or several droplets at the same position, or varying the size of a droplet. Recording medium 132 comprises any type of material suitable for printing upon which recording material 134 is applied, such as paper (web or cut-sheet), plastic, card stock, transparent sheets, a substrate for 3D printing, cloth, etc. In one embodiment, print mechanism 126 may include one or more printheads that are configured to jet or eject droplets of a print fluid, such as ink (e.g., water, solvent, oil, or UV-curable), through a plurality of orifices or nozzles. The orifices or nozzles may be grouped according to ink types (e.g., colors such as Cyan (C), Magenta (M), Yellow (Y), Key black (K) or formulas such as for pre-coat, image and protector coat), which may be referred to as color planes. In another embodiment, print mechanism 126 may include a drum that selectively collects electrically-charged powdered ink (toner), and transfers the toner to recording medium 132. Media conveyance device 130 is configured to move recording medium 132 relative to print mechanism 126. In other embodiments, portions of print mechanism 126 may be configured to move relative to recording medium 132.

Image forming apparatus 100 may include various other components not specifically illustrated in FIG. 1.

When RIP 115 rasterizes the print data 111, the output is a digital continuous tone image where individual pixels are defined with pixel values that are relatively large. For example, the digital continuous tone image may have 8-bit pixel values or larger. A digital continuous tone image generated by RIP 115 is referred to herein as a "raster image". An 8-bit pixel value may represent 256 different intensities of a color. However, a typical print mechanism (e.g., print mechanism 126) may not be capable of reproduction at 256 different levels. Thus, a halftoning process may be performed to define the individual pixels with lower multi-bit values, such as two-bits, three-bits, etc. FIG. 1 also illustrates a halftone system 140 implemented in print controller 114. Halftone system 140 comprises circuitry, logic, hardware, and/or other components configured to perform a multi-level halftoning process on one or more raster images, which is described in further detail below. Although halftone system 140 is shown as being implemented in print controller 114 of DFE 110, halftone system 140 may be implemented in print engine controller 124 (as shown in FIG. 1), in a host system or another system coupled to image forming apparatus 100, or in other systems.

Figure 2:
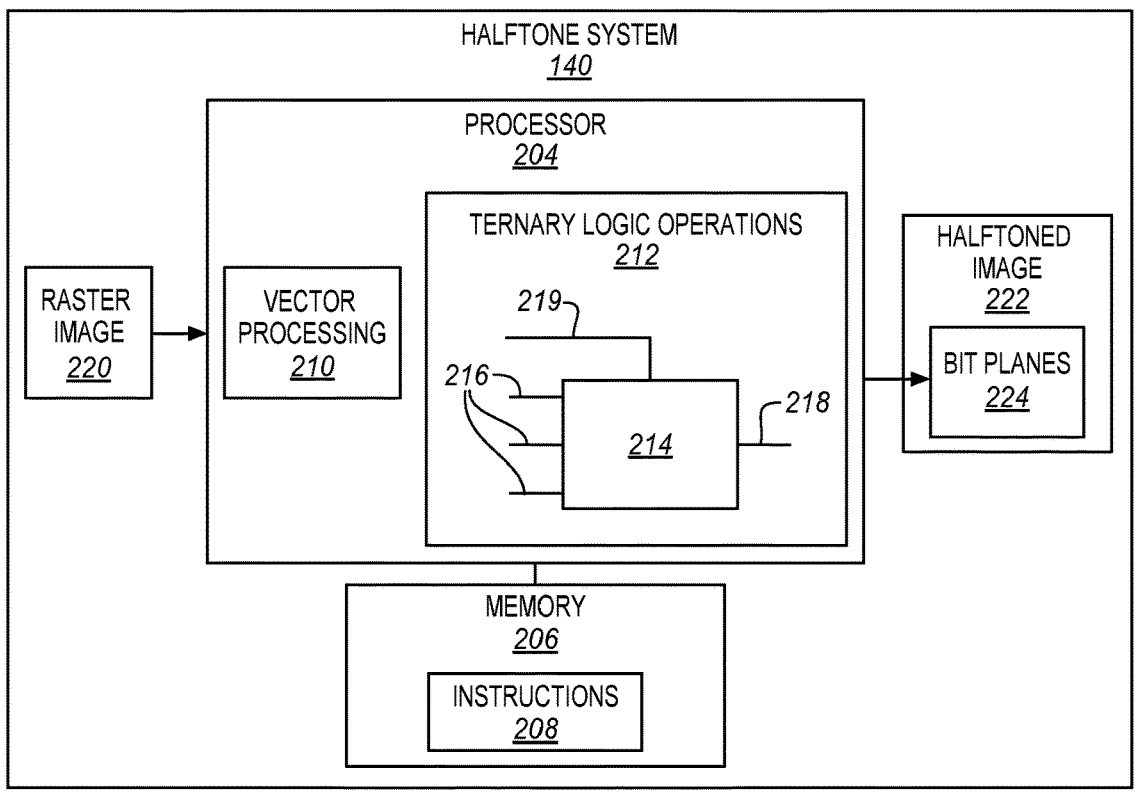
FIG. 2 is a schematic diagram of a halftone system in an illustrative embodiment.

FIG. 2 is a schematic diagram of halftone system 140 in an illustrative embodiment. Halftone system 140 includes one or more processors 204 and a memory 206. Processor 204 represents the internal circuitry, logic, hardware, etc., that provides the functions of halftone system 140. Processor 204 may be configured to execute instructions 208 (i.e., computer program code) for software that are loaded into memory 206. Processor 204 may comprise a set of one or more processors or may comprise a multi-processor core, depending on the particular implementation. Memory 206 is a computer readable storage medium for data, instructions 208, applications, etc., and is accessible by processor 204. Memory 206 is a hardware storage device capable of storing information on a temporary basis and/or a permanent basis. Memory 206 may comprise volatile or non-volatile Random-Access Memory (RAM), Read-Only Memory (ROM), FLASH devices, volatile or non-volatile Static RAM (SRAM) devices, magnetic disk drives, Solid State Disks (SSDs), or any other volatile or non-volatile storage device.

Figure 3:
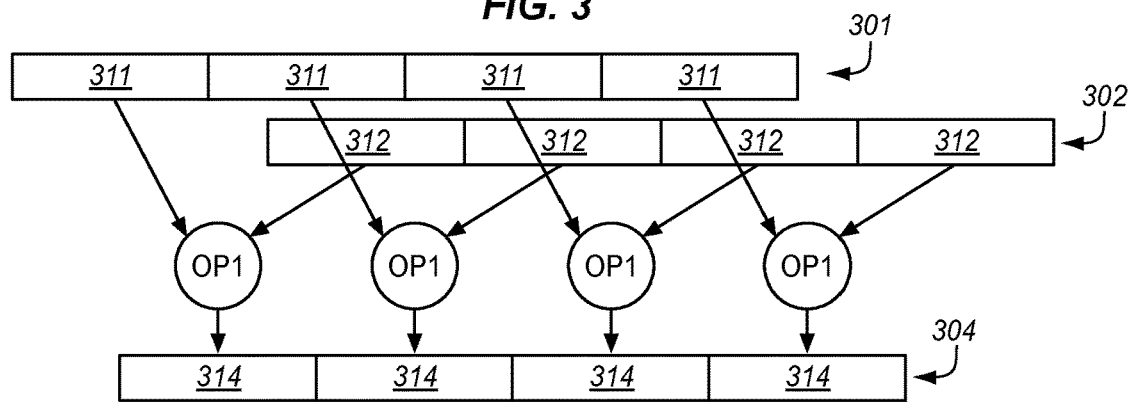
FIG. 3 illustrates a vector processing operation.

Processor 204 is configured for vector processing 210. Vector processing 210 is a type of processing that operates on sets of values called "vectors" at a time, as compared to operating on a single value. FIG. 3 illustrates a vector processing operation. Processor 204, for example, receives two vectors 301-302 as input; each one with a set of operands. Vector 301 includes a set of operands 311, and vector 302 includes a set of operands 312. Processor 204 is able to perform the same operation (OP1) on both sets of operands 311 and 312 (one operand from each vector) at a time, and outputs a vector 304 with the results 314. Processor 204 may have a variety of architectures that allow for vector processing 210, such as a Central Processing Unit (CPU) or a Graphics Processing Unit (GPU) that use a Single Instruction Multiple Data (SIMD) paradigm. In a SIMD paradigm, a single instruction is executed in parallel on multiple data points.

Figure 4:
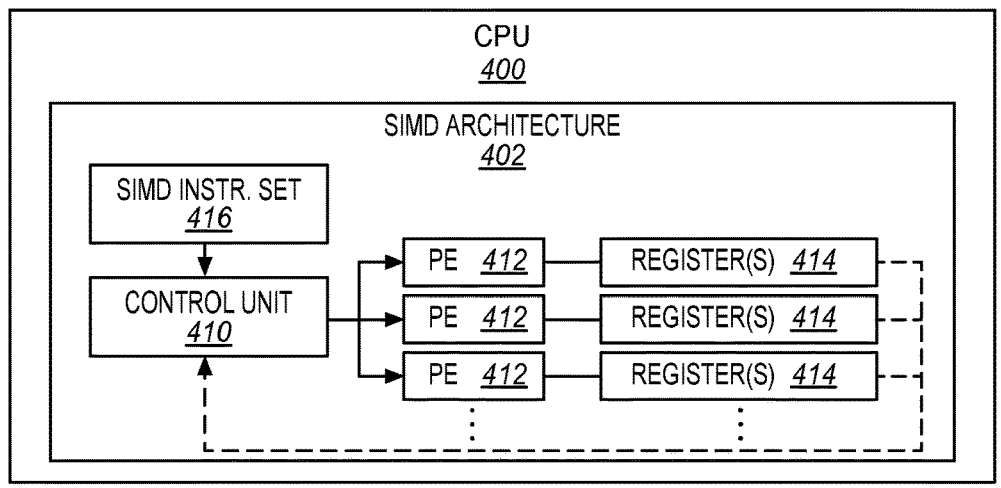
FIGS. 4-5 illustrate a CPU and a GPU that perform SIMD operations.
Figure 5:
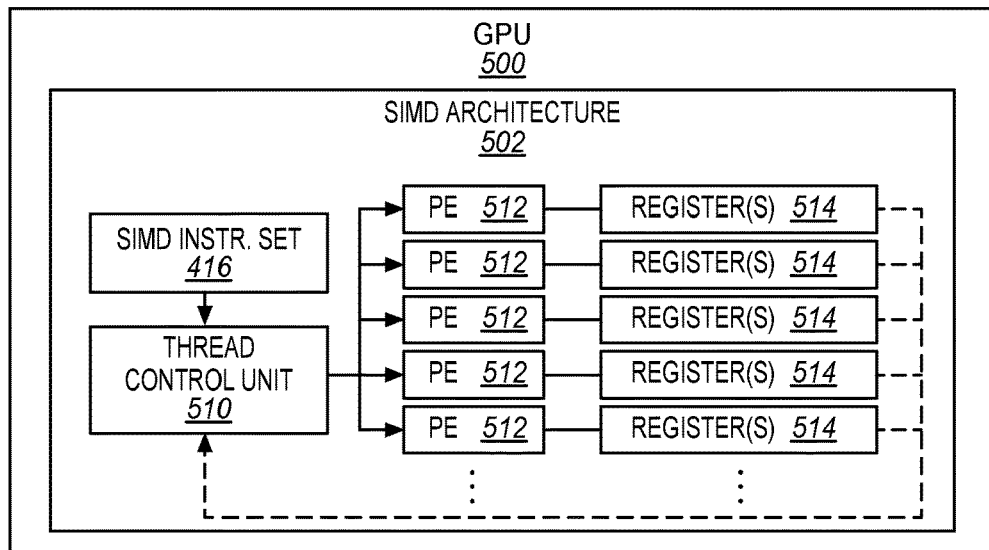

FIGS. 4-5 illustrate a CPU 400 and a GPU 500, respectively, that perform SIMD operations. CPU 400 includes a SIMD architecture 402, which includes a control unit 410, and one or more processing clusters that include multiple processing elements (PE) 412 (e.g., Arithmetic Logic Units (ALUs)) and corresponding registers 414 (also referred to as memory modules (MM)). Although three processing elements 412 are illustrated in this example, more or less processing elements may be used in other examples. Control unit 410 is configured to fetch or retrieve a SIMD instruction set 416, and issue instructions to the PEs 412 from the instruction set 416 for a clock cycle. Control unit 410 is also configured to manage data fetching, and data storage. PEs 412 represent the computational resources that perform operations based on instructions from control unit 410. Registers 414 are configured to temporarily store data for operations performed by PEs 412. For example, registers 414 may be 64-bits wide, 128-bits wide, 256-bits wide, 512-bits wide, etc. Control unit 410 may also manage processes for loading data into registers 414. GPU 500 (see FIG. 5) includes a SIMD architecture 502, which includes a thread control unit 510, and one or more processing clusters that include multiple PEs 512 and corresponding registers 514. It is noted that FIGS. 4-5 illustrate a basic structure of a CPU 400 and a GPU 500 for SIMD operations, and other structures are considered herein.

In FIG. 2, processor 204 is also configured for ternary logic operations 212. Ternary logic is a function which maps three input Boolean values (or "bits") to a single output bit. Processor 204 may include a ternary logic subsystem 214 that includes three inputs 216 and one output 218. Ternary logic subsystem 214 may be configured to perform a plurality of ternary logic functions. For example, there may be 256 ($2^8$) possible ternary logic functions defined. To select between the ternary logic functions, ternary logic subsystem 214 further includes a selector parameter 219 (e.g., an 8-bit code) that is used to select a desired ternary logic function for a given set of inputs 216. CPU 400 and/or GPU 500 as discussed above may provide machine level instructions to implement ternary logic in this manner.

As a general overview of a multi-level halftoning process, halftone system 140 receives a raster image 220 as input, and converts the raster image 220 to a multi-bit halftoned image 222 that indicates pixel values with fewer bits than the raster image 220. Halftone system 140 iterates over one or more blocks of pixels from the raster image 220 for a color plane to compare sets of pixel values from the raster image 220 to thresholds that are defined to distinguish the different intensity levels. A comparison of a set of pixel values with a threshold results in a corresponding set of comparison bits. Ternary logic operations 212 are then performed on the comparison bits to generate bit planes 224 for the pixels. Each bit plane 224 represents one of the bits for the pixels. For example, a first bit plane represents the low-order bits of the pixels, a second bit plane represents higher-order bits of the pixels, etc. The bit planes 224, in combination, represent the multi-bit halftoned image 222.

Figure 6A:
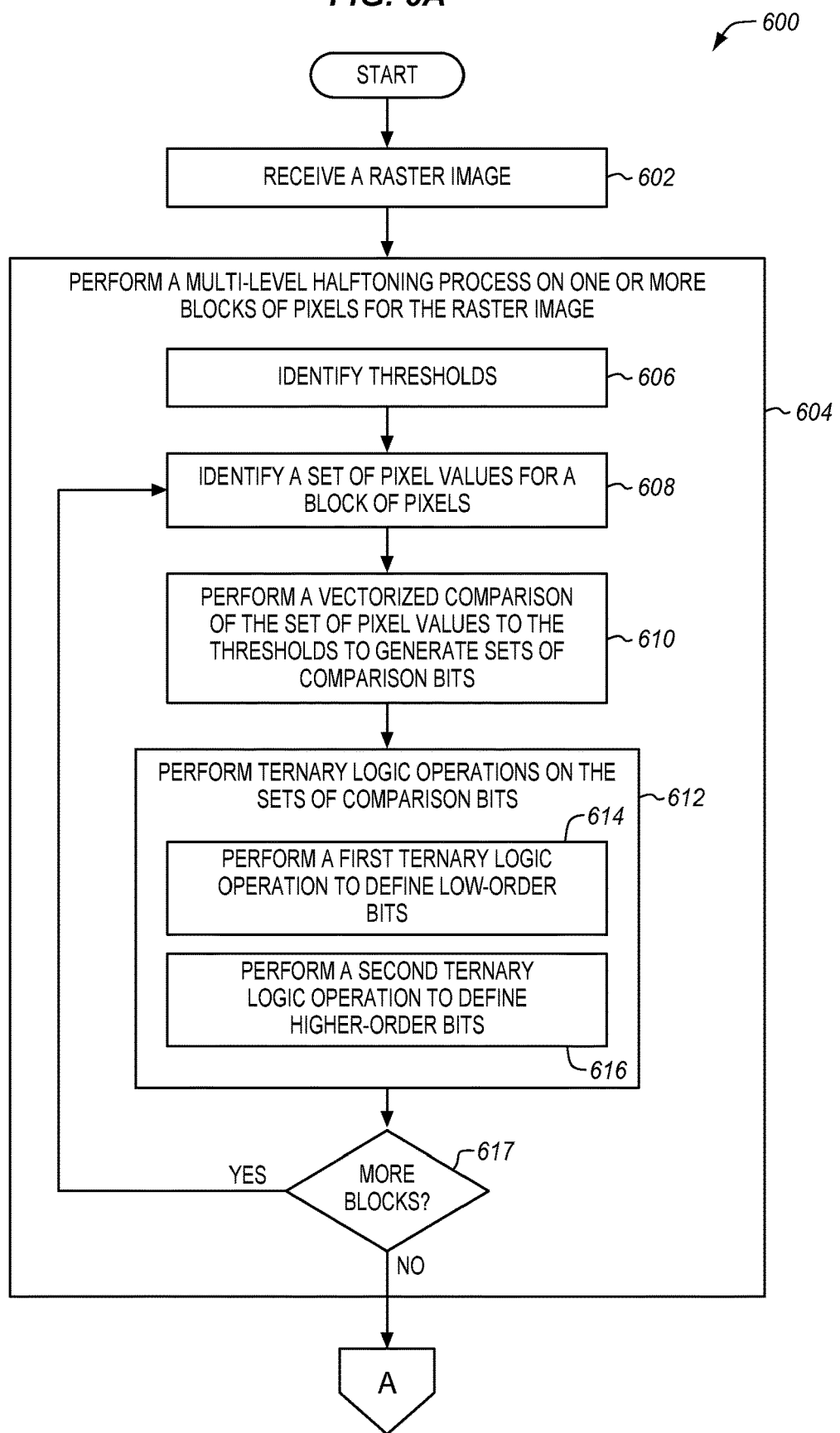
FIGS. 6A-6B depict a flowchart illustrating a method of halftoning in an illustrative embodiment.
Figure 6B:
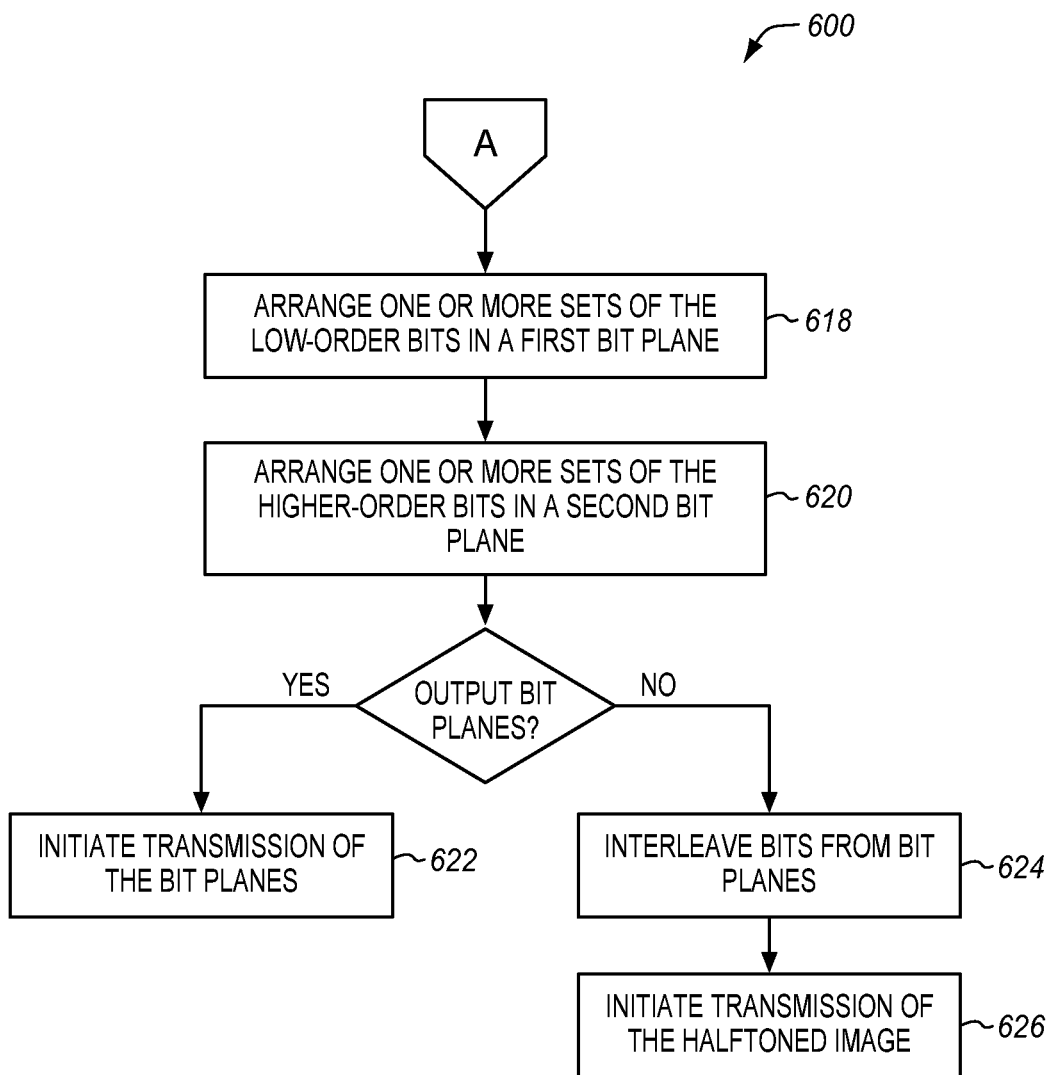

FIGS. 6A-6B depict a flowchart illustrating a method 600 of halftoning in an illustrative embodiment. The steps of method 600 are described with reference to halftone system 140 in FIG. 2, but those skilled in the art will appreciate that method 600 may be performed with other systems. The steps of the flowcharts described herein are not all inclusive and may include other steps not shown. The steps described herein may also be performed in an alternative order.

In FIG. 6A, processor 204 receives a raster image 220 (step 602) for a color plane, such as generated by RIP 115. FIG. 7 illustrates a raster image 220. Raster image 220 is a data structure that represents an array of pixels 702 with multi-bit pixel values (PV). The pixels are arranged in rows 710 and columns 711. There are "m+1" number of rows 710, and "n+1" number of columns 711. For illustrative purposes, each pixel 702 is noted with a (row,column) identifier (e.g., "(0,0)"). Each pixel 702 has an associated pixel value PV that is defined by x-bits, such as 8-bits, 16-bits, etc. For example, if the pixel values are 8-bit, then each pixel 702 may have any value between 0-255 (decimal). Raster image 220 is for a single color plane, such as Cyan (C), Magenta (M), Yellow (Y), or Key black (K).

In FIG. 6A, processor 204 performs a multi-level halftoning process on one or more blocks of pixels 702 for raster image 220 (step 604). A multi-level halftoning process produces output that defines pixel values in multiple bits, as opposed to a bi-level halftoning process. For example, a multi-level halftoning process may produce pixel values that are two-bits, three-bits, etc. Processor 204 may identify thresholds for multi-level reproduction (step 606). Multilevel reproduction involves multiple intensity levels, and therefore multiple thresholds that distinguish the different intensity levels. There is one less threshold than number of intensity levels. For example, a pixel represented by two bits may have four intensity levels (e.g., 00, 01, 10, 11). In this two-bit example with four intensity levels, there are three thresholds that distinguish or divide the four intensity levels. Thus, processor 204 may identify a first threshold, a second threshold, and a third threshold, such as by retrieving these thresholds from memory 206. In a two-bit example with three intensity levels, there are two thresholds that distinguish or divide the three intensity levels. In a three-bit example with eight intensity levels, there may be seven thresholds that distinguish the eight intensity levels. Processor 204 identifies the thresholds in "sets" to accommodate vector processing as described below.

Figure 9:
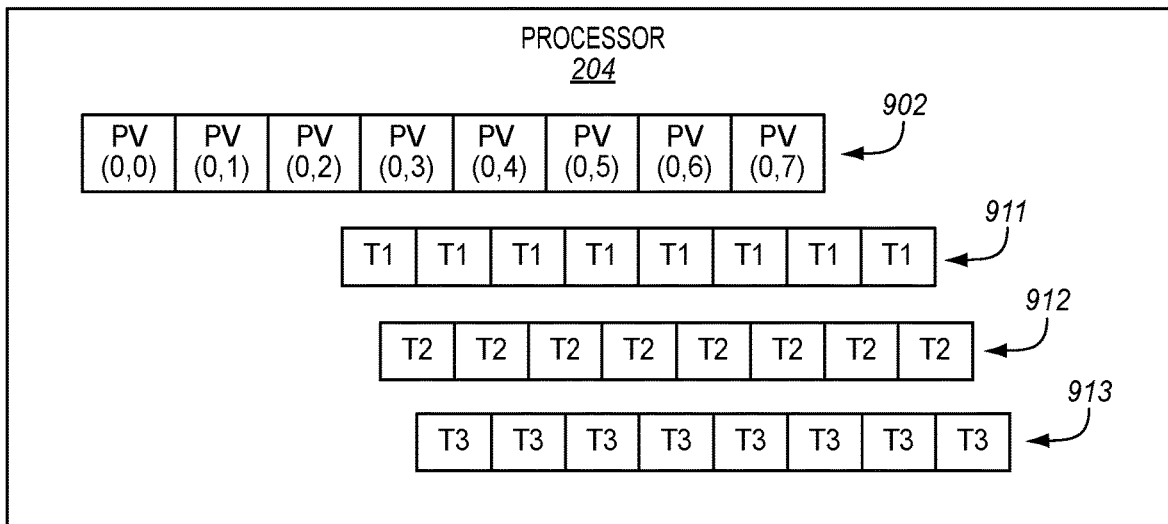
FIG. 9 is a schematic diagram of a processor with a set of pixel values for a block loaded in a local memory in an illustrative embodiment.

For the multi-level halftoning process, halftone system 140 may operate on one or more blocks of pixels at a time. Thus, processor 204 may identify a set of pixel values (PV) for pixels 702 in a block (step 608). A block of pixels 702 comprises a grouping or number of pixels that are processed at a time. A block may be a number of pixels consecutive in a row 710 of raster image 220, a number of pixels that wrap around from one row 710 to another, or another desired grouping of pixels. FIG. 8 illustrates a block 800 of pixels 702 in raster image 220 in an illustrative embodiment. In this example, block 800 includes eight pixels 702 in a single row. But as explained above, block 800 may have other numbers or groupings of pixels in other examples. Processor 204 may load the set of pixel values for block 800 in a register, a local memory, or other memory location. FIG. 9 is a schematic diagram of processor 204 with the set 902 of pixel values for block 800 loaded in a local memory in an illustrative embodiment.

Figure 10:
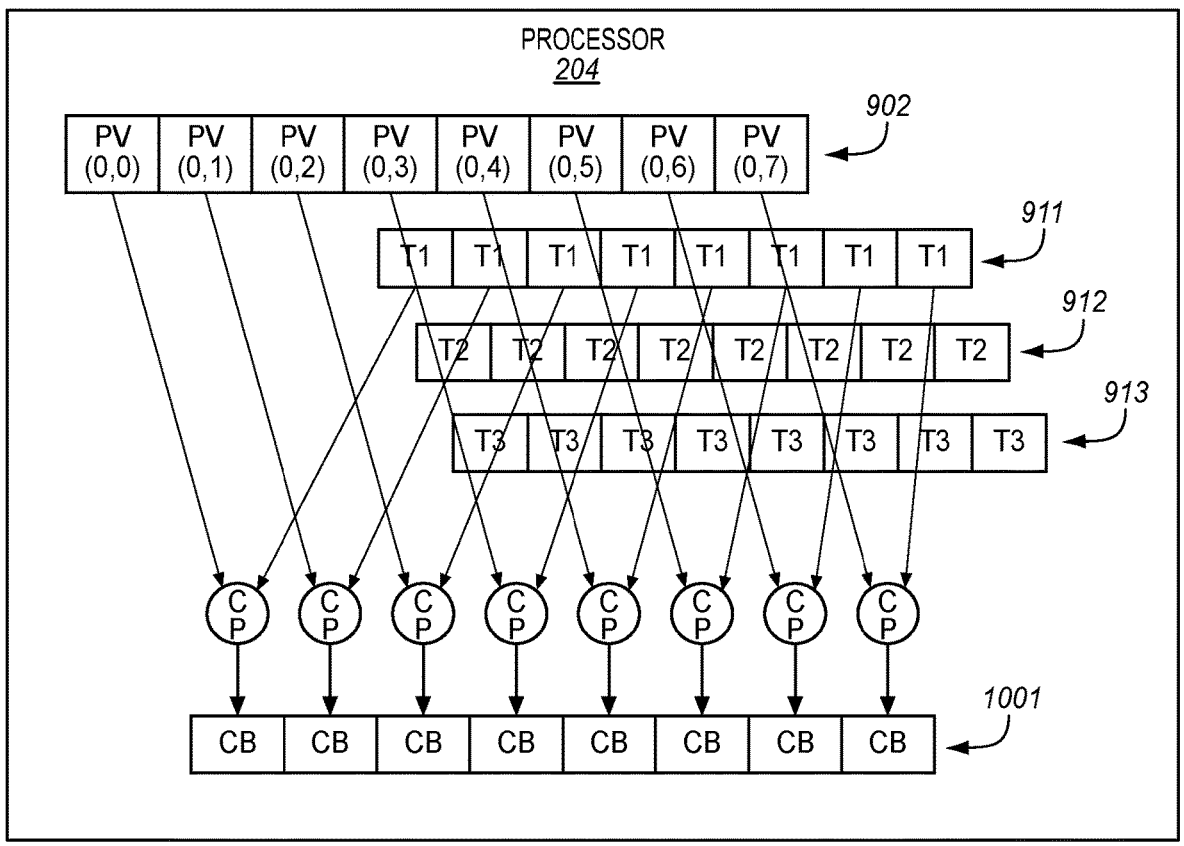
FIGS. 10-12 illustrate a vectorized comparison in an illustrative embodiment.
Figure 11:
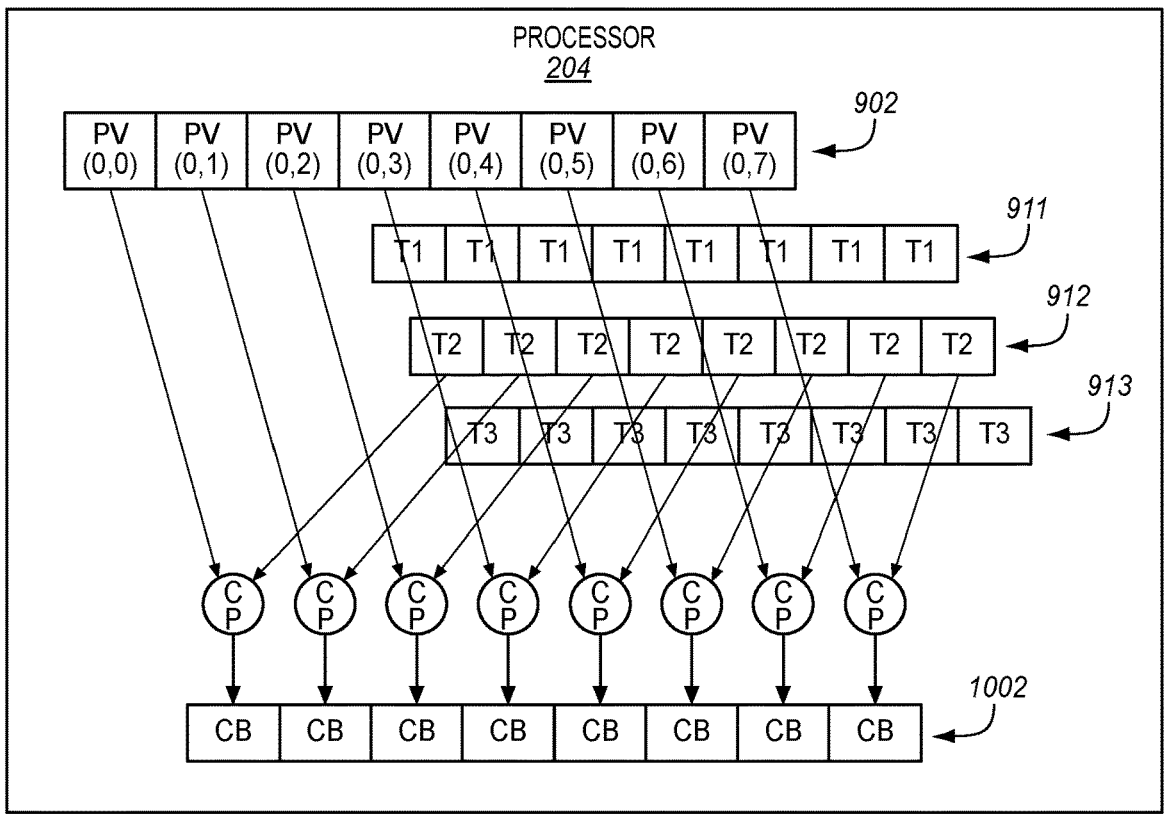
Figure 12:
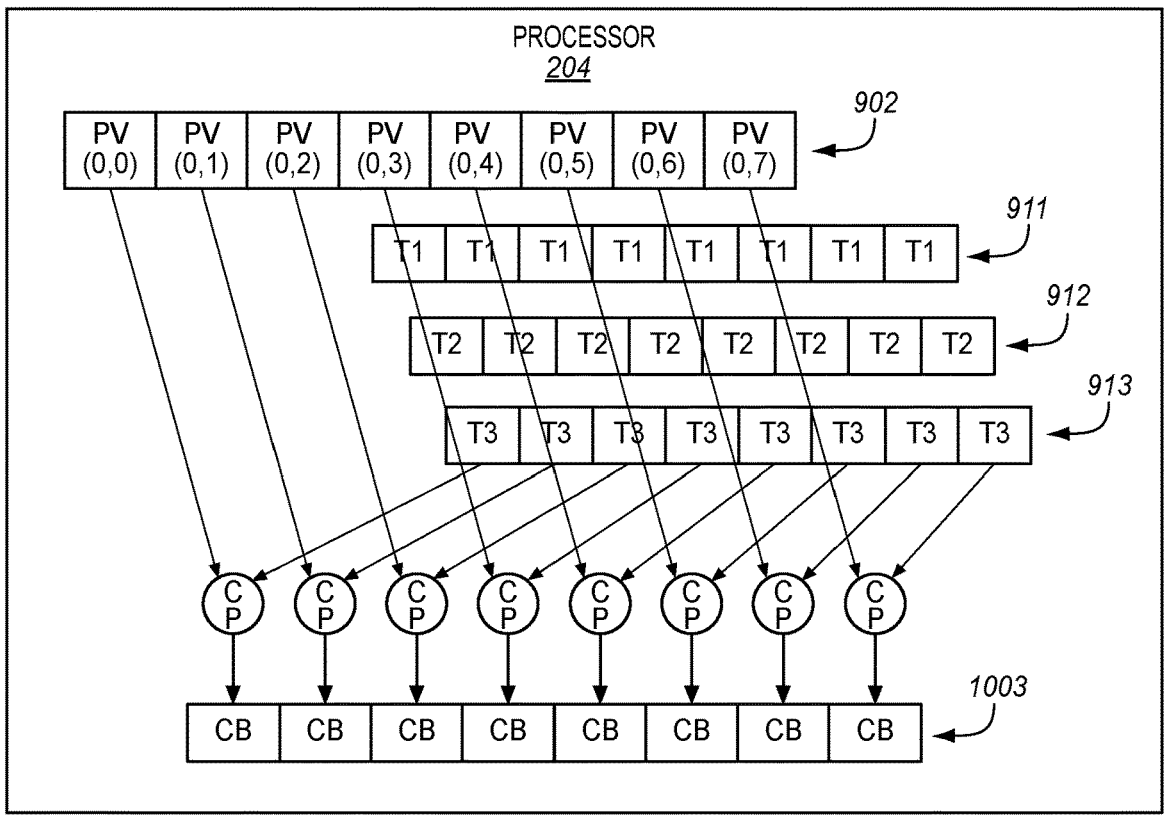

FIG. 9 further illustrates a set 911 of first thresholds (T1), a set 912 of second thresholds (T2), and a set 913 of third thresholds (T3) loaded in a local memory. In this example, the set 911 of first thresholds (T1) is used to distinguish a first intensity level and a second intensity level. The set 912 of second thresholds (T2) is used to distinguish the second intensity level and a third intensity level. The set 913 of third thresholds (T3) is used to distinguish the third intensity level and a fourth intensity level. Additional sets of thresholds may be loaded into processor 204 in cases of more than four intensity levels. In FIG. 6A, processor 204 performs a vectorized comparison of the set 902 of pixel values (PV) to the thresholds, such as in sets 911-913 (step 610). A vectorized comparison means that the set 902 of pixel values (PV) is compared to a set 911-913 of thresholds at a time (e.g., a clock cycle). The set 902 of pixel values (PV) and a set 911-913 of thresholds may be considered "vectors" where the same comparison operation is performed on both sets of values (one from each vector) at a time. It is also noted that the set 902 of pixel values (PV) may be compared to each set 911-913 of thresholds simultaneously depending on the capability of processor 204. FIGS. 10-12 illustrate a vectorized comparison in an illustrative embodiment. In FIG. 10, processor 204 performs the vectorized comparison of the set 902 of pixel values (PV) to the set 911 of first thresholds to generate a first set 1001 of comparison bits (CB). A set of comparison bits represents the result of the comparison for each pixel value and threshold. For example, if a pixel value is "220" and the threshold is "64", then the comparison bit for that pixel may be "1". If the pixel value is "50" and the threshold is "64", then the comparison bit for that pixel may be "0". Thus, a set of comparison bits corresponds with one of the thresholds and indicates the pixel values that exceed the threshold. In one embodiment, the first threshold may be for a first or smallest droplet/dot size, which means that a pixel value that exceeds the first threshold corresponds with at least the smallest droplet/dot size (i.e., the smallest droplet/dot size or a larger drop size).

In FIG. 11, processor 204 performs the vectorized comparison of the set 902 of pixel values (PV) to the set 912 of second thresholds to generate a second set 1002 of comparison bits (CB). In one embodiment, the second threshold may be for a second droplet/dot size that is larger than the first droplet/dot size, meaning that a pixel value that exceeds the second threshold corresponds with at least the second droplet/dot size (i.e., the second droplet/dot size or larger). In FIG. 12, processor 204 performs the vectorized comparison of the set 902 of pixel values (PV) to the set 913 of third thresholds to generate a third set 1003 of comparison bits (CB). In one embodiment, the third threshold may be for a third droplet/dot size that is larger than the second droplet/dot size, meaning that a pixel value that exceeds the third threshold corresponds with at least the third droplet/dot size (i.e., the third droplet/dot size or larger). Although the vectorized comparisons for the thresholds are shown in different figures, it is understood that the vectorized comparisons may be performed simultaneously within processor 204. Also, although vectorized comparisons are shown for three thresholds, processor 204 may perform vectorized comparisons for more or less thresholds depending on the number of intensity levels considered for the multi-level halftoning.

In FIG. 6A, the vectorized comparisons from step 610 result in multiple sets of comparison bits (e.g., sets 1001-1003). For multi-level halftoning, there are three or more sets of comparison bits whenever four or more output levels are used. Processor 204 performs ternary logic operations on the sets 1001-1003 of comparison bits (step 612). Ternary logic produces one output bit per three input bits. Thus, each one of the ternary logic operations outputs one bit of a pixel value for the halftoned image 222. For example, processor 204 may perform a first ternary logic operation (step 614) to define a low-order bit (least significant bit) of a pixel value, and a second ternary logic operation (step 616) to define the next higher-order bit of the pixel value. These ternary logic operations are performed to define the low-order bits and the higher-order bits for the pixels 702 in block 800.

Figure 13:
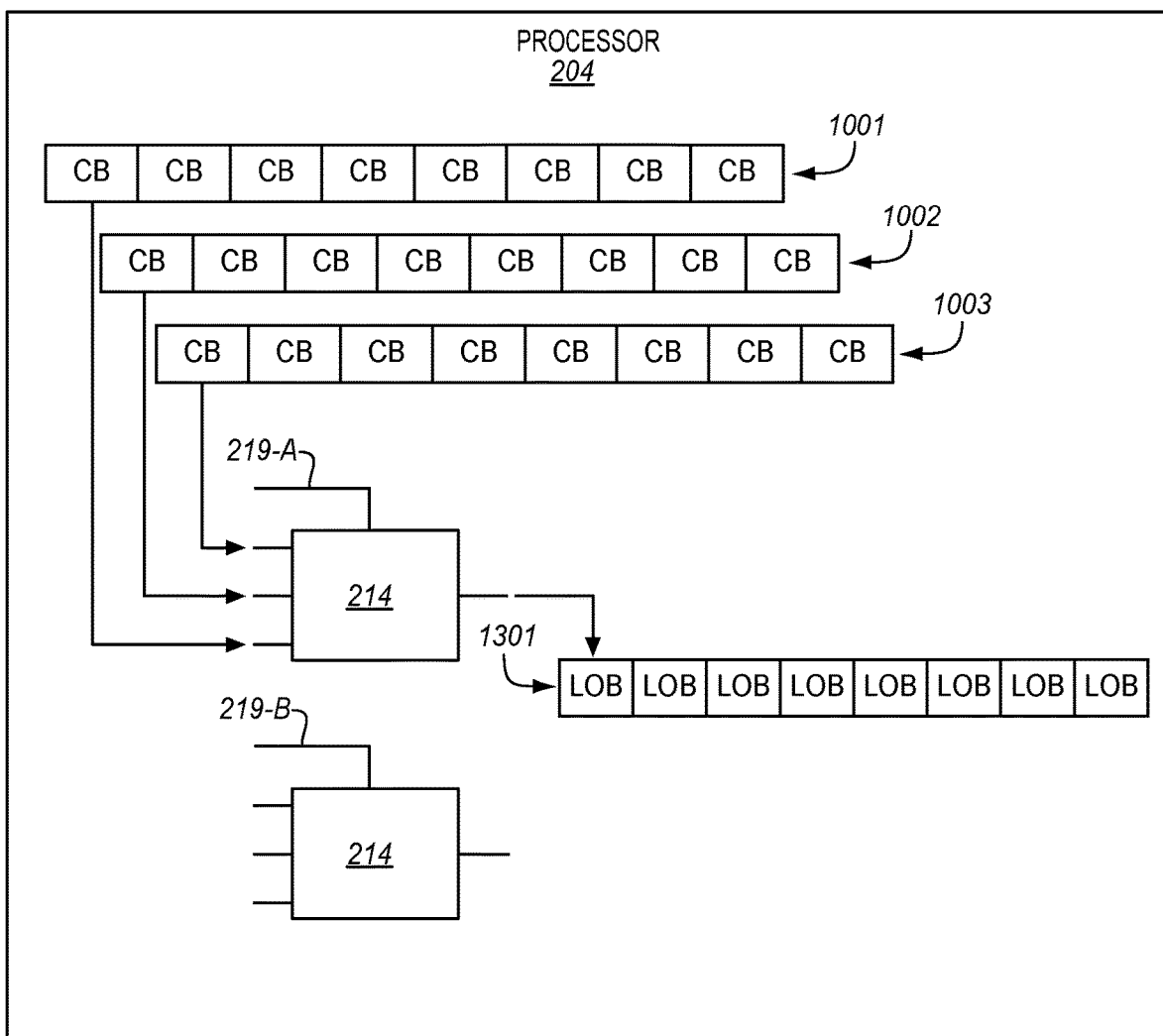
FIGS. 13-14 illustrate ternary logic operations in an illustrative embodiment.
Figure 14:
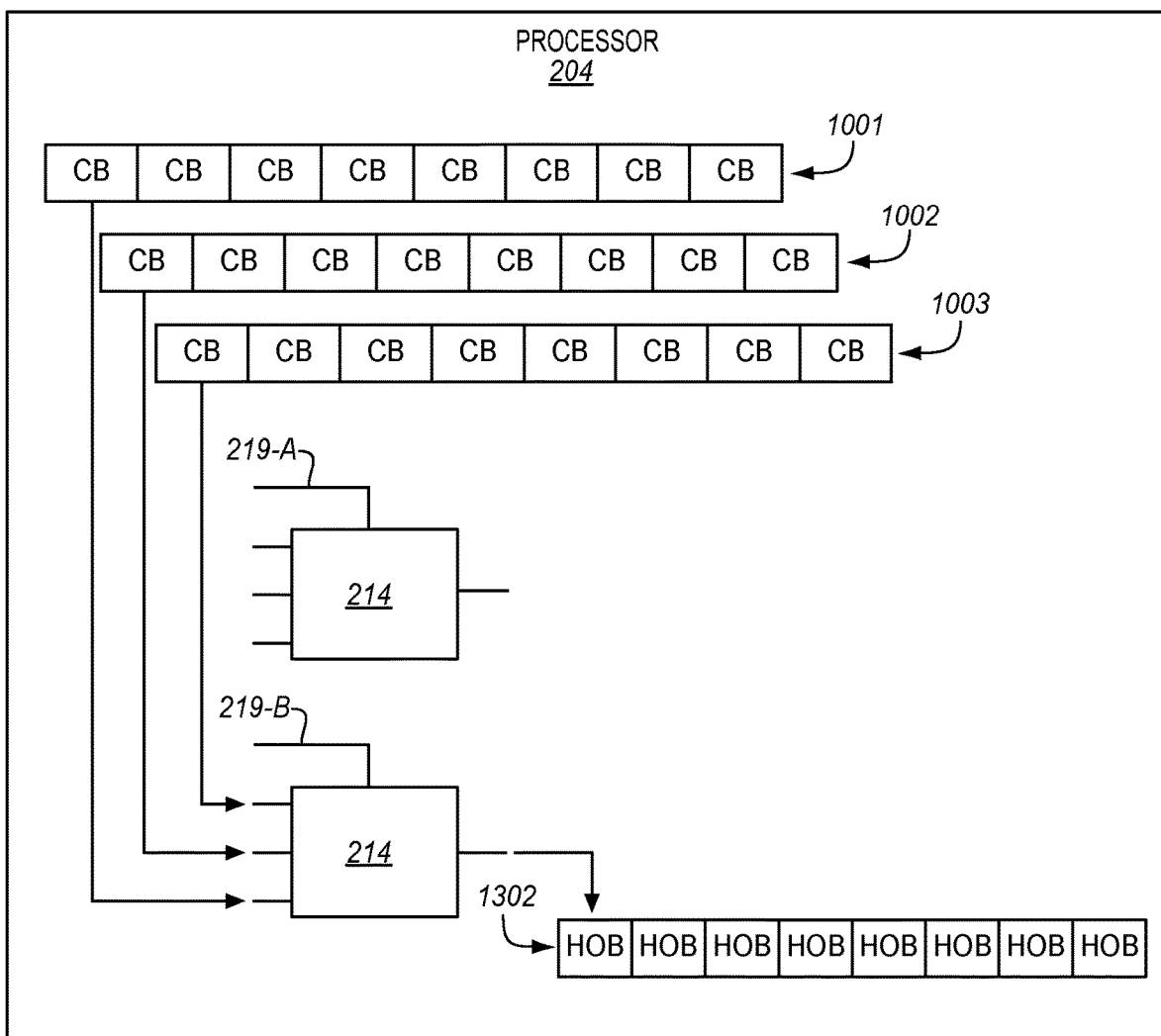

FIGS. 13-14 illustrate ternary logic operations in an illustrative embodiment. In FIG. 13, processor 204 performs a first ternary logic operation with the first set 1001 of comparison bits, the second set 1002 of comparison bits, and the third set 1003 of comparison bits as input. The first ternary logic operation outputs a set 1301 of low-order bits (LOB) for the block 800 of the pixels 702. In FIG. 14, processor 204 performs a second ternary logic operation with the first set 1001 of comparison bits, the second set 1002 of comparison bits, and the third set 1003 of comparison bits as input. The second ternary logic operation outputs a set 1302 of higher-order bits (HOB) for the block 800 of the pixels 702. For a two-bit halftoning process, the set 1302 of higher-order bits (HOB) represents the most-significant bits of the pixel values. Although not explicitly shown in FIGS. 13-14, processor 204 may perform a ternary logic operation on each of the comparison bits in sets 1001-1003 at the same time (e.g., same clock cycle). Also, although the ternary logic operations are shown in different figures, it is understood that the ternary logic operations may be performed simultaneously within processor 204.

Figure 15:
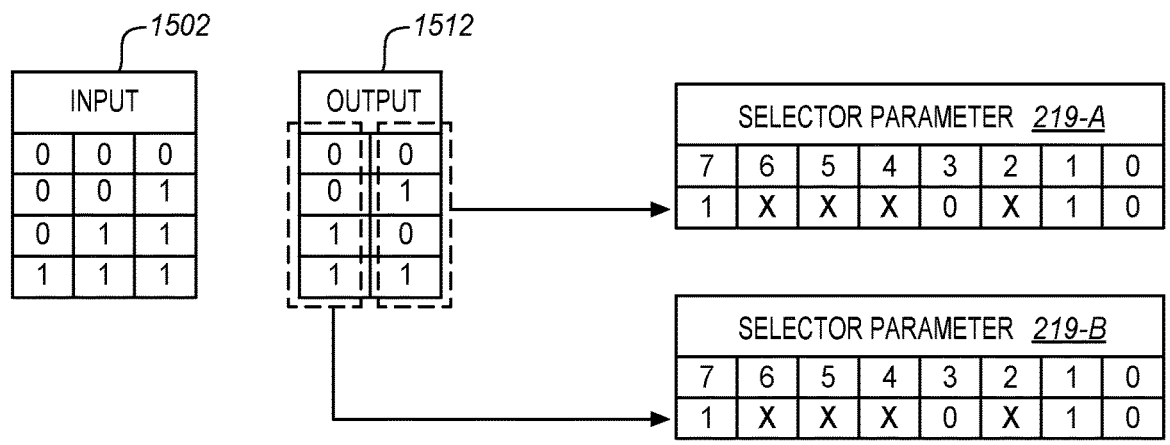
FIG. 15 illustrates computing of selector parameters in an illustrative embodiment.

As stated above, there may be 256 possible ternary logic functions defined for ternary logic subsystems 214. The selector parameters 219-A/219-B are computed for ternary logic subsystems 214 to select the desired ternary logic functions for each bit plane. A selector parameter may be thought of as a lookup table. The three input bits form a number i between zero and seven. The $i^{th}$ bit of the selector parameter gives the output bit for the case of input i. FIG. 15 illustrates computing of selector parameters 219-A/219-B in an illustrative embodiment. The input table 1502 represents comparison bits arranged from right to left, such as from sets 1001-1003. The comparison bits resulting from the smallest threshold are on the right, and comparison bits resulting from the largest threshold are on the left. These bits are interpreted as a binary number between zero and seven. Not all numbers between zero and seven are needed for well-designed halftone threshold arrays, since the thresholds for smaller droplets/dots are always exceeded when the threshold for larger droplets/dots is exceeded. Accordingly, if there are four intensity levels, then the values that appear in input table 1502 are zero, one, three, and seven (i.e., "000", "001", "011", and "111"). Output table 1512 indicates the pixel value or pixel symbol desired when the input bits are as shown in input table 1502. For example, an input of "000" may be mapped to a pixel value of "00", an input of "001" may be mapped to a pixel value of "01", an input of "011" may be mapped to a pixel value of "10", and an input of "111" may be mapped to a pixel value of "11". However, any pixel value may be mapped to each possible set of input bits.

To compute a selector parameter 219-A for the first bit plane (i.e., for the low-order bits), we use the rightmost column of the output table 1512. Selector parameter 219-A is an eight-bit value. According to the rightmost column, a value of "0" is mapped to an input of "000" (decimal value 0), so bit zero of the selector parameter 219-A is set to "0". A value of "1" is mapped to an input of "001" (decimal value 1), so bit one of the selector parameter 219-A is set to "1". A value of "0" is mapped to an input of "011" (decimal value 3), so bit three of the selector parameter 219-A is set to "0". A value of "1" is mapped to an input of "111" (decimal value 7), so bit seven of the selector parameter 219-A is set to "1". The other bits of the selector parameter 219-A are set to a "don't care" value ("X"). Since the corresponding input bit patterns do not occur in well-designed halftone threshold arrays, these values will have no effect on the halftoned image. They may be thought of as values that will appear in the case of an error in the threshold array.

To compute a selector parameter 219-B for the second bit plane (i.e., for higher-order bits), we use leftmost column of the output table 1512. According to the leftmost column, a value of "0" is mapped to an input of "000" (decimal value 0), so bit zero of the selector parameter 219-B is set to "0". A value of "0" is mapped to an input of "001" (decimal value 1), so bit one of the selector parameter 219-B is set to "0". A value of "1" is mapped to an input of "011" (decimal value 3), so bit three of the selector parameter 219-B is set to "1". A value of "1" is mapped to an input of "111" (decimal value 7), so bit seven of the selector parameter 219-B is set to "1". The other bits of the selector parameter 219-B are set to a "don't care" value ("X").

The ternary logic operations output a set 1301 of low-order bits (LOB) for the block 800 of pixels 702, and a set 1302 of higher-order bits (HOB) for the block 800 of pixels 702. Processor 204 may repeat the multi-level halftoning process on multiple blocks of pixels 702 defined within raster image 220 in a similar manner. For example, if there is a determination (step 617) that the multi-level halftoning process is performed on additional blocks 800 of pixels 702, then method 600 returns to step 608 to identify a set of pixel values for another block 800 of pixels 702.

Processor 204 is configured to generate a plurality of bit planes 224 representing the pixel values for halftoned image 222. For example, a two-bit (four level) output includes two bit planes: one for the low-order bits, and one for the higher-order bits of each pixel. In FIG. 6B, processor 204 arranges one or more sets 1301 of the low-order bits in a first bit plane (step 618). The first bit plane therefore represents the low-order bits for the pixels of halftoned image 222. Processor 204 also arranges one or more sets 1302 of the higher-order bits in a second bit plane (step 620). The second bit plane may therefore represent the next higher-order bits for the pixels of halftoned image 222. Processor 204 may arrange one or more additional bit planes depending on the number of bits used to define pixels values in halftoned image 222.

Figure 16:
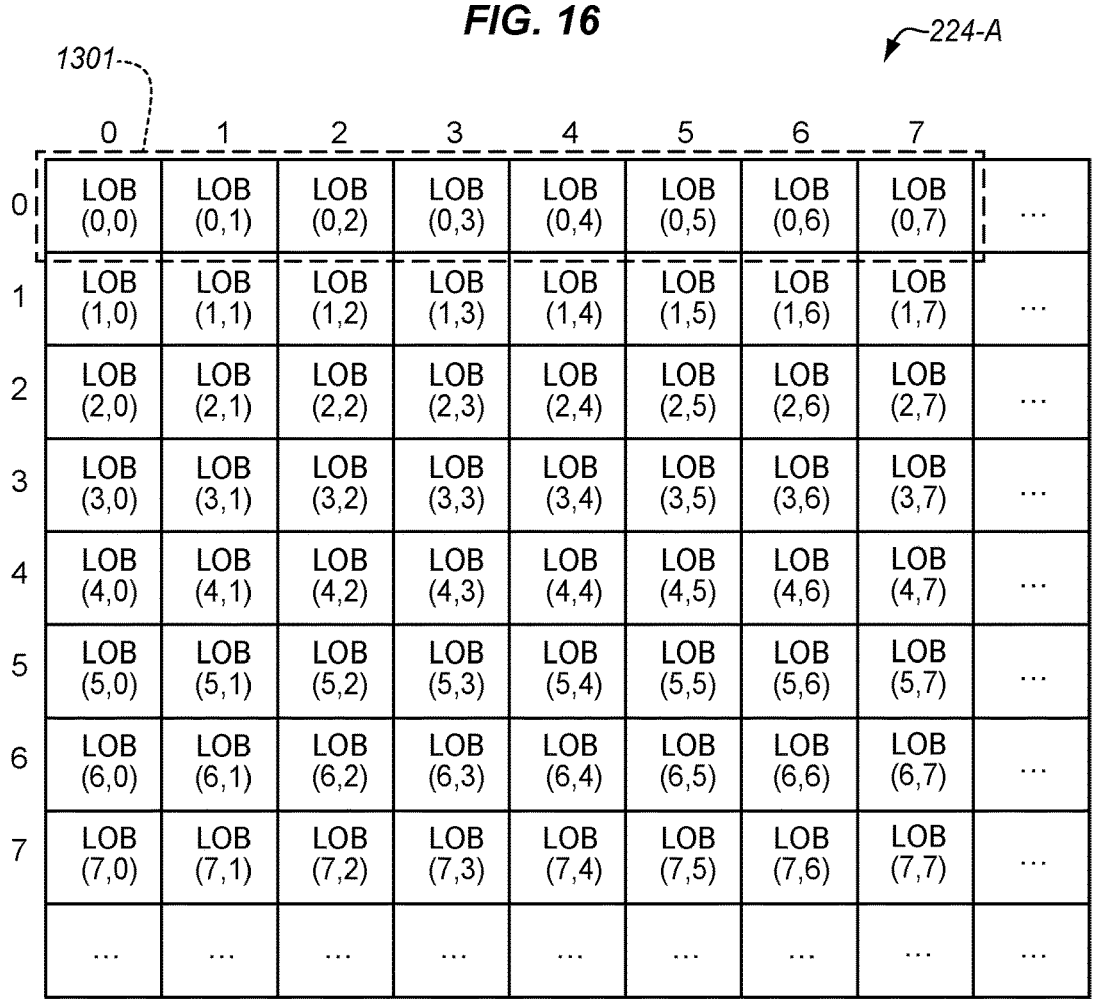
FIGS. 16-17 illustrate bit planes that define pixel values for a halftoned image in an illustrative embodiment.
Figure 17:
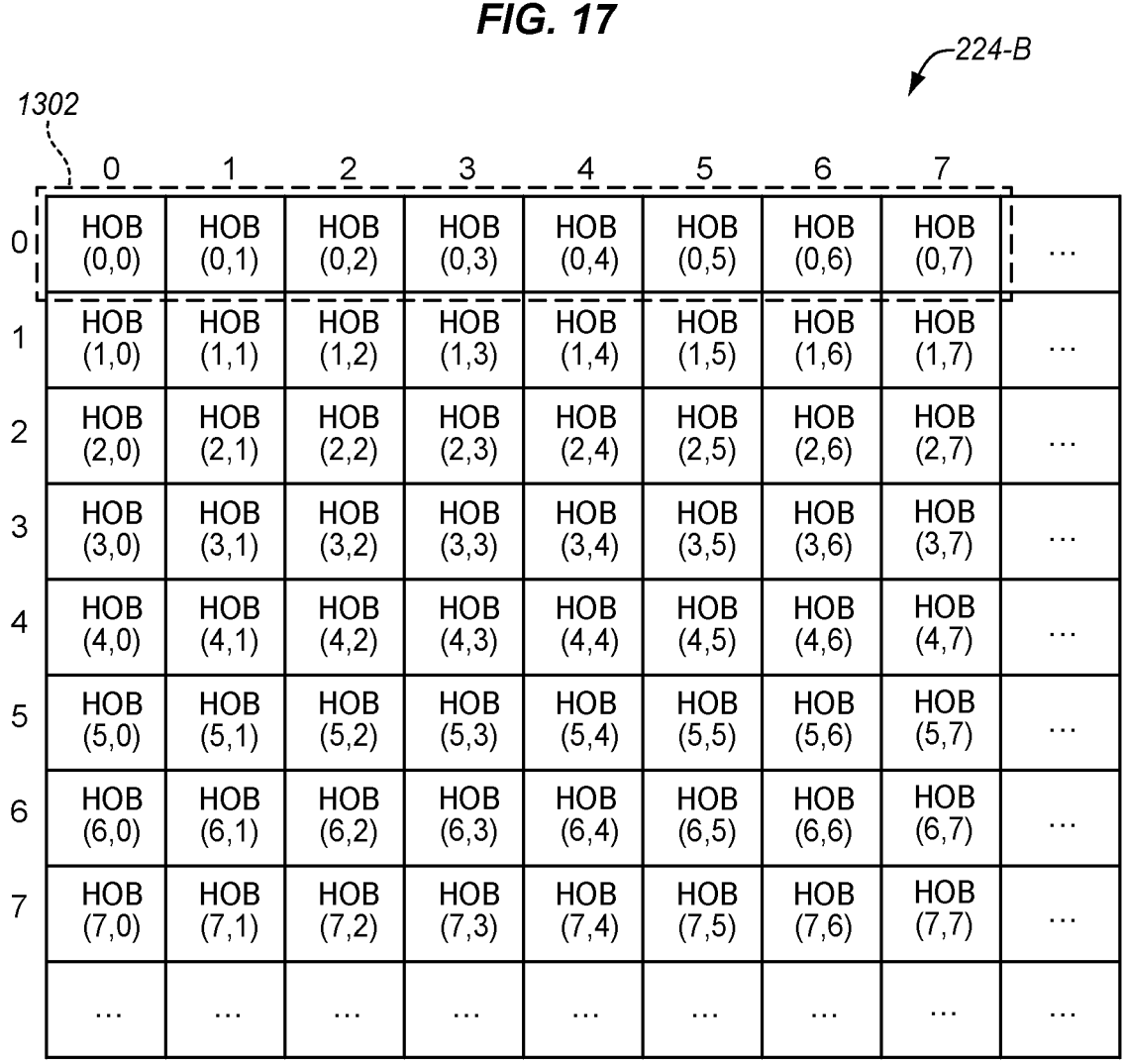

FIGS. 16-17 illustrate bit planes that define pixel values for halftoned image 222 in an illustrative embodiment. FIG. 16 illustrates the first bit plane 224-A representing the low-order bits (LOB) for one or more blocks of pixels. A bit plane is a data structure that represents one bit of a multi-bit pixel value (PV) for an array of pixels 702. When processor 204 performs the first ternary logic operation (step 614), it generates a set 1301 of low-order bits (LOB) for a block 800 of pixels 702. Processor 204 arranges the set 1301 of low-order bits in bit plane 224-A so that each of the low-order bits defines part of a pixel value for its corresponding pixel. For example, set 1301 includes the low-order bits for pixels (0,0), (0,1), (0,2), etc. The low-order bits are illustrated as being arranged in rows and columns to depict how the low-order bits correspond to pixels. However, a bit plane may have any desired structure that maps low-order bits to pixels. Processor 204 may arrange multiple sets 1301 of low-order bits in bit plane 224-A for multiple blocks 800. Thus, bit plane 224-A may include the low-order bits for pixels corresponding with a portion of a sheetside, a logical page on an N-up sheetside, a full sheetside, etc. Typically, pages to be imaged are combined into logical "sheetsides" that consist of one or more logical pages of equal length which when laid out for printing, span the width of the print web. The sheetside represents the image to be printed on a side of a sheet (or equivalent) of recording medium 132. FIG. 17 illustrates the second bit plane 224-B representing the higher-order bits (HOB) for one or more blocks of pixels. When processor 204 performs the second ternary logic operation (step 616), it generates a set 1302 of higher-order bits (HOB) for a block 800 of pixels 702. Processor 204 arranges the set 1302 of higher-order bits in bit plane 224-B so that each of the higher-order bits defines part of a pixel value for its corresponding pixel. For example, set 1302 includes higher-order bits for pixels (0,0), (0,1), (0,2), etc. Processor 204 may arrange multiple sets 1302 of higher-order bits in bit plane 224-B for multiple blocks 800. Thus, bit plane 224-B may include higher-order bits for pixels corresponding with a portion of a sheetside, a logical page on an N-up sheetside, a full sheetside, etc. In one embodiment, each bit plane 224-A/224-B may include the bits of eight pixels in a byte.

Processor 204 may be configured to output bit planes 224 to print engine 120, print mechanism 126, or another subsystem. For example, print engine 120 may be configured to handle individual bit planes for a printing operation. Thus, processor 204 may initiate transmission of the bit planes (e.g., the first bit plane 224-A and the second bit plane 224-B) to a destination, such as print engine 120, print mechanism 126, or another subsystem (step 622). For example, when halftone system 140 is implemented in print controller 114 of DFE 110 (see FIG. 1), processor 204 may access print engine interface 116 to transmit the bit planes 224 over communication link 117 to print engine 120. Print engine 120 may then initiate printing operations based on the bit planes 224. When halftone system 140 is implemented in print engine controller 124 of print engine 120, processor 204 may transmit the bit planes 224 to print mechanism 126, or to another subsystem within print engine controller 124 for further processing.

Figure 18:
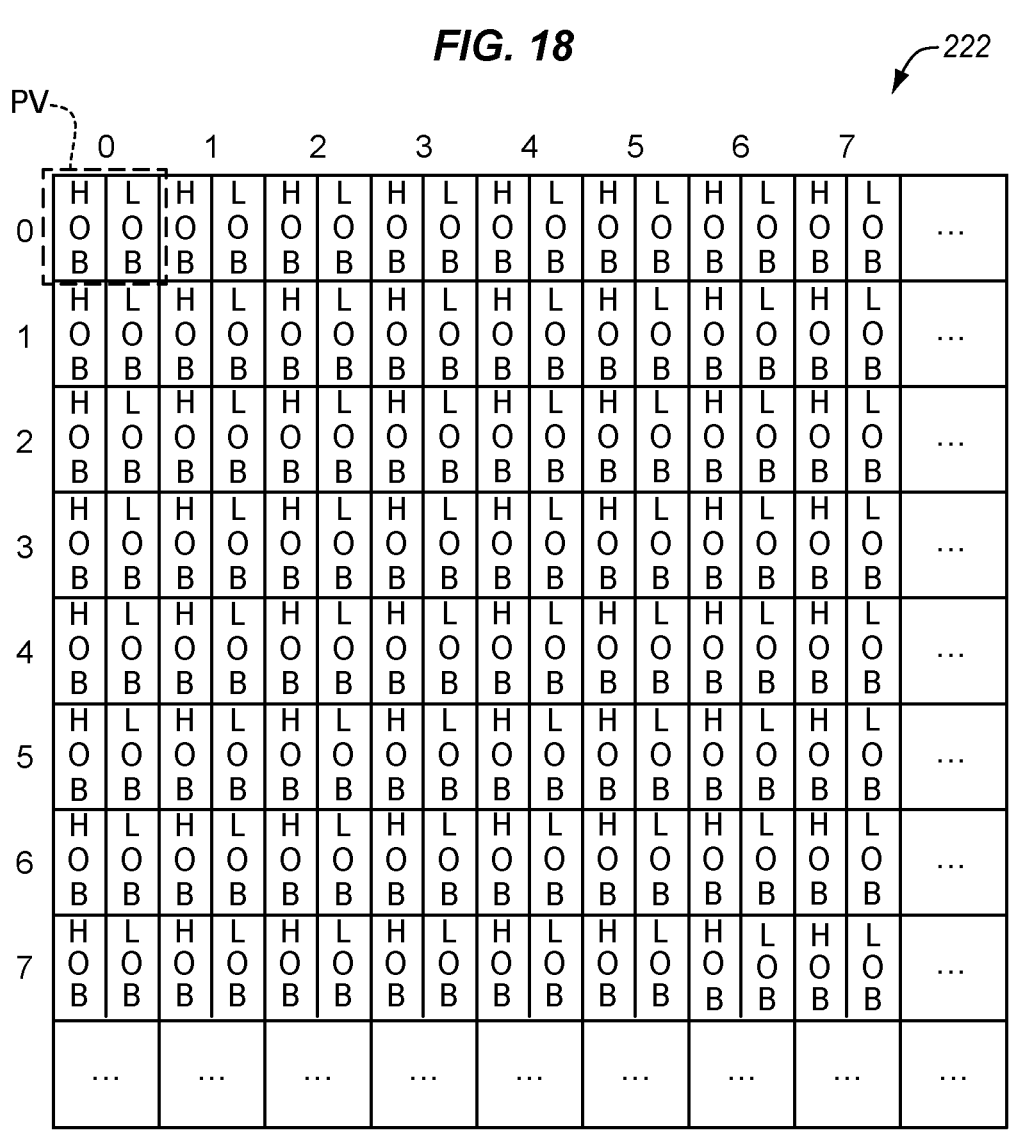

In another embodiment, processor 204 may be configured to output a halftoned image 222. In this case, processor 204 may perform an interleave operation to merge the bit planes 224 of halftoned image 222 (step 624). FIG. 18 illustrates halftoned image 222 with bit planes 224-A/224-B merged in an illustrative embodiment. Halftoned image 222 is a data structure that represents an array of pixels with multi-bit pixel values (PV). The pixel values of halftoned image 222 are y-bit values, which are less than the x-bit values used in raster image 220. The interleaving operation takes a higher-order bit (HOB) from bit plane 224-B, and a low-order bit (LOB) from bit plane 224-A to form the pixel values in halftoned image 222. Processor 204 may then initiate transmission of the halftoned image 222 to a destination, such as print engine 120, print mechanism 126, or another subsystem (step 626). For example, when halftone system 140 is implemented in print controller 114 of DFE 110 (see FIG. 1), processor 204 may access print engine interface 116 to transmit the halftoned image 222 over communication link 117 to print engine 120. Print engine 120 may then initiate printing operations based on the halftoned image 222. When halftone system 140 is implemented in print engine controller 124 of print engine 120, processor 204 may transmit the halftoned image 222 to print mechanism 126, or to another subsystem within print engine controller 124 for further processing.

The multi-level halftoning process described above is performed for a raster image 220 of a single color plane. For a CMYK color model, for example, method 600 may be repeated to halftone raster images for each of the color planes. An interleave operation as described above may also be performed on bit planes for multiple color planes. The interleaving of bits for each color plane can target the bit fields reserved for that color in a multi-color halftoned image. In this case, when the bits for each color planes are interleaved, all colors would then already be interleaved in the halftoned image.

Some of the examples provided above illustrate halftoning for four intensity levels. However, the concepts described herein apply to three intensity levels, five intensity levels, six intensity levels, or more. The case of three intensity levels is treated in a similar way as four intensity levels, except the third threshold is set to zero. For the case of eight intensity levels, there are seven thresholds. The comparison bits resulting from a comparison of the pixel values and a first threshold, a second threshold, and a third threshold may be input to a first ternary logic operation to output one bit plane. The comparison bits resulting from a comparison of the pixel values and a fifth threshold, a sixth threshold, and a seventh threshold may be input to a second ternary logic operation to output another bit plane. The comparison bits resulting from a comparison of the pixel values and a fourth threshold may be output to yet another bit plane (e.g., the most significant bit). The comparison of the fourth threshold may also be used to select which ternary logic result is written to the least significant bit plane. The cases of five to seven intensity levels may be treated the same eight intensity levels, except that the unused thresholds are treated as if they were zero.

Figure 19:
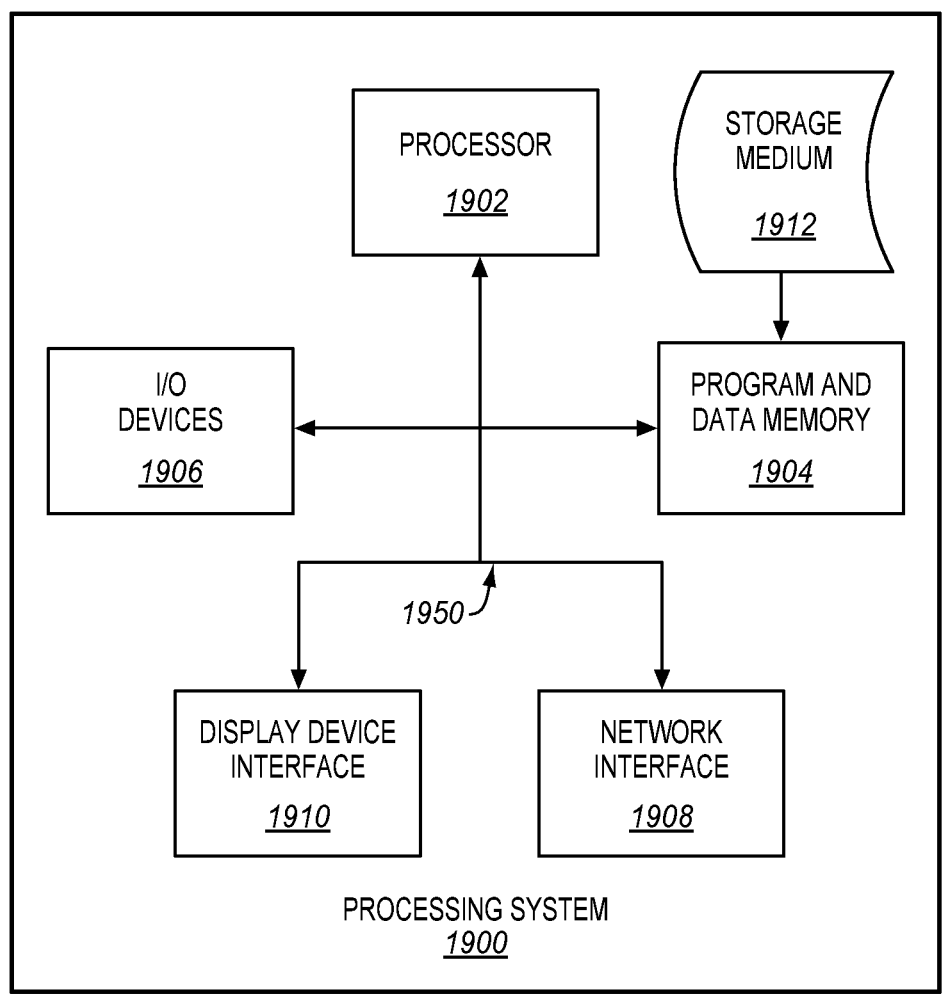
FIG. 19 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image forming apparatus 100 to perform the various operations disclosed herein. FIG. 19 illustrates a processing system 1900 operable to execute a computer readable medium embodying programmed instructions to perform desired functions in an illustrative embodiment. Processing system 1900 is operable to perform the above operations by executing programmed instructions tangibly embodied on computer readable storage medium 1912. In this regard, embodiments can take the form of a computer program accessible via computer-readable medium 1912 providing program code for use by a computer or any other instruction execution system. For the purposes of this description, computer readable storage medium 1912 can be anything that can contain or store the program for use by the computer.

Computer readable storage medium 1912 can be an electronic, magnetic, optical, electromagnetic, infrared, or semiconductor device. Examples of computer readable storage medium 1912 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 1900, being suitable for storing and/or executing the program code, includes at least one processor 1902 coupled to program and data memory 1904 through a system bus 1950. Program and data memory 1904 can include local memory employed during actual execution of the program code, bulk storage, and cache memories that provide temporary storage of at least some program code and/or data in order to reduce the number of times the code and/or data are retrieved from bulk storage during execution.

I/O devices 1906 (including but not limited to keyboards, displays, pointing devices, etc.) can be coupled either directly or through intervening I/O controllers. Network adapter interfaces 1908 may also be integrated with the system to enable processing system 1900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1910 may be integrated with the system to interface to one or more display devices, such as printing systems and screens for presentation of data generated by processor 1902.

Although specific embodiments are described herein, the scope of the disclosure is not limited to those specific embodiments. The scope of the disclosure is defined by the following claims and any equivalents thereof.

What is claimed is:

1. A halftone system, comprising:
at least one processor; and
a memory including computer program code executable by the processor to cause the halftone system to:
receive a raster image comprising an array of pixels; and
perform a multi-level halftoning process on one or more blocks of the pixels;
for the multi-level halftoning process:
the processor further causes the halftone system to identify thresholds that distinguish different intensity levels;
for each block of the pixels from the one or more blocks, the processor causes the halftone system to:
identify a set of pixel values for the pixels in the block;
perform a vectorized comparison of the set of pixel values to each of the thresholds to generate sets of comparison bits;
perform a first ternary logic operation with three of the sets of comparison bits as input to define a set of low-order bits for the pixels in the block; and
perform a second ternary logic operation with three of the sets of comparison bits as input to define a set of higher-order bits for the pixels in the block.

2. The halftone system of claim 1 wherein the processor further causes the halftone system to:
arrange one or more sets of the low-order bits in a first bit plane; and
arrange one or more sets of the higher-order bits in a second bit plane.

3. The halftone system of claim 2 wherein:
the processor causes the halftone system to initiate transmission of the first bit plane and the second bit plane to a destination.

4. The halftone system of claim 2 wherein:
the first bit plane includes the low-order bits and the second bit plane includes the higher-order bits for the pixels on a full sheetside.

5. The halftone system of claim 2 wherein:
the first bit plane includes the low-order bits and the second bit plane includes the higher-order bits for the pixels on a portion of a sheetside.

6. The halftone system of claim 2 wherein:
the first bit plane includes the low-order bits of eight pixels in a byte; and
the second bit plane includes the higher-order bits of eight pixels in a byte.

7. The halftone system of claim 2 wherein:
the processor causes the halftone system to perform an interleave operation to merge the first bit plane and the second bit plane to form pixel values of a halftoned image.

8. The halftone system of claim 1 wherein:
the processor causes the halftone system to perform the multi-level halftoning process on a plurality of raster images for different color planes.

9. The halftone system of claim 1 wherein:
the processor comprises a Central Processing Unit (CPU) with a Single Instruction Multiple Data (SIMD) architecture.

10. The halftone system of claim 1 wherein:
the processor comprises a Graphical Processing Unit (GPU) with a Single Instruction Multiple Data (SIMD) architecture.

11. An image forming apparatus comprising:
the halftone system of claim 1.

12. The halftone system of claim 1 wherein the processor further causes the halftone system to:
perform a vectorized comparison of:
the set of pixel values and a first one of the thresholds to generate a first set of comparison bits;
the set of pixel values and a second one of the thresholds to generate a second set of comparison bits, wherein the second one of the thresholds is greater than the first one of the thresholds; and
the set of pixel values and a third one of the thresholds to generate a third set of comparison bits, wherein the third one of the thresholds is greater than the second one of the thresholds;
perform the first ternary logic operation with the first set of comparison bits, the second set of comparison bits, and the third set of comparison bits as input to define the set of low-order bits; and
perform the second ternary logic operation with the first set of comparison bits, the second set of comparison bits, and the third set of comparison bits as input to define the set of higher-order bits.

13. A method of halftoning, the method comprising:
receiving a raster image comprising an array of pixels; and
performing a multi-level halftoning process on one or more blocks of the pixels by:
identifying thresholds that distinguish different intensity levels; and
for each block of the pixels from the one or more blocks:
identifying a set of pixel values for the pixels in the block;
performing a vectorized comparison of the set of pixel values to each of the thresholds to generate sets of comparison bits;
performing a first ternary logic operation with three of the sets of comparison bits as input to define a set of low-order bits for the pixels in the block; and
performing a second ternary logic operation with three of the sets of comparison bits as input to define a set of higher-order bits for the pixels in the block.

14. The method of claim 13 further comprising:
arranging one or more sets of the low-order bits in a first bit plane; and
arranging one or more sets of the higher-order bits in a second bit plane.

15. The method of claim 14 further comprising:
initiating transmission of the first bit plane and the second bit plane to a destination.

16. The method of claim 14 further comprising:
performing an interleave operation to merge the first bit plane and the second bit plane to form pixel values of a halftoned image.

17. A non-transitory computer readable medium embodying programmed instructions which, when executed by a processor, are operable for performing a method of halftoning, the method comprising:
receiving a raster image comprising an array of pixels; and performing a multi-level halftoning process on one or more blocks of the pixels by:
identifying thresholds that distinguish different intensity levels; and
for each block of the pixels from the one or more blocks:
identifying a set of pixel values for the pixels in the block;
performing a vectorized comparison of the set of pixel values to each of the thresholds to generate sets of comparison bits;
performing a first ternary logic operation with three of the sets of comparison bits as input to define a set of low-order bits for the pixels in the block; and
performing a second ternary logic operation with three of the sets of comparison bits as input to define a set of higher-order bits for the pixels in the block.

18. The computer readable medium of claim 17 wherein the method further comprises:

arranging one or more sets of the low-order bits in a first bit plane; and arranging one or more sets of the higher-order bits in a second bit plane.

19. The computer readable medium of claim 18 wherein the method further comprises:

initiating transmission of the first bit plane and the second bit plane to a destination.

20. The computer readable medium of claim 18 wherein the method further comprises:

performing an interleave operation to merge the first bit plane and the second bit plane to form pixel values of a halftoned image.

* * * * *